July 3, 1951  N. E. HART  2,559,566
WEIGHING SCALE
Filed May 2, 1944  3 Sheets-Sheet 1
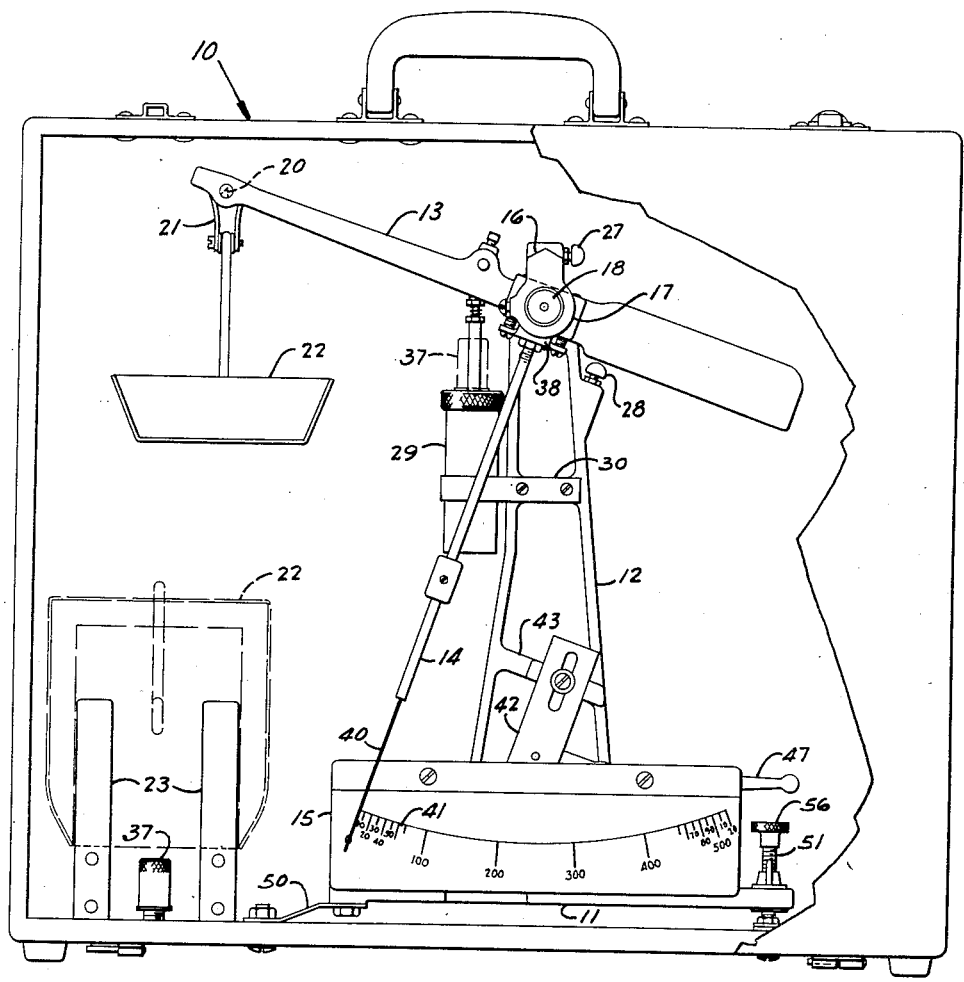
Fig. I
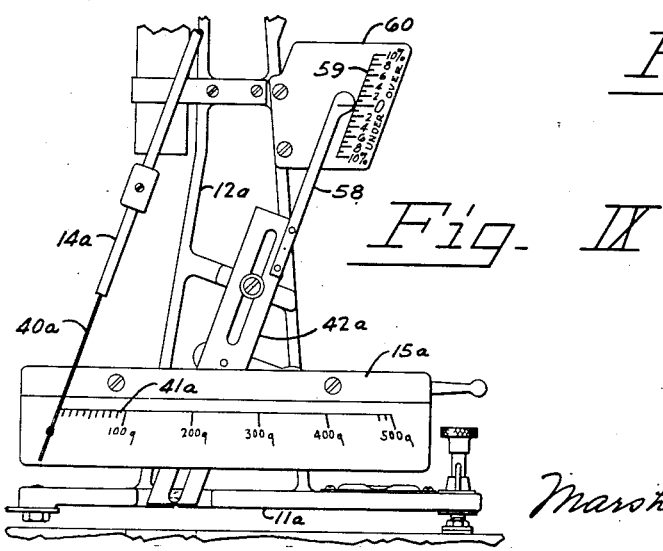
Fig. II
INVENTOR.
Norman E. Hart
BY
Marshall & Marshall
ATTORNEYS

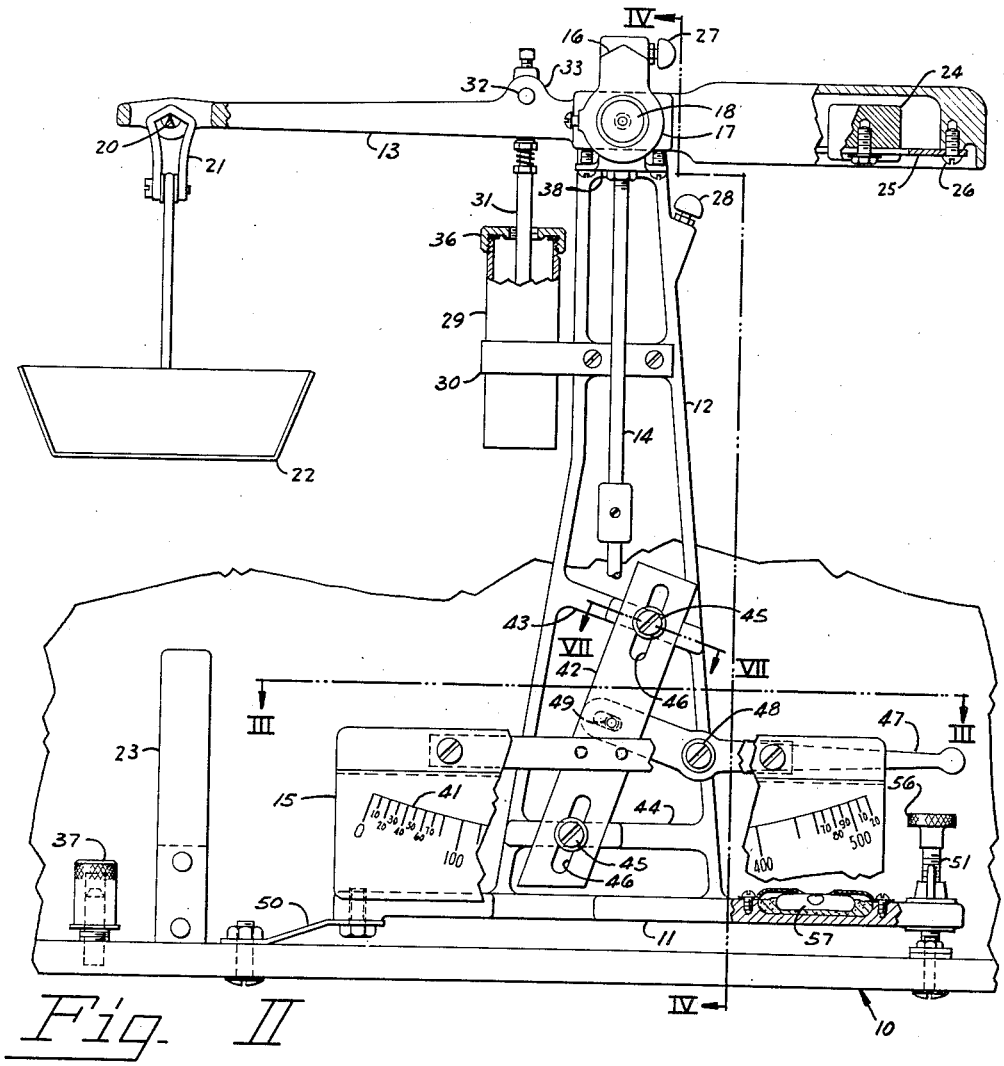
Fig. II
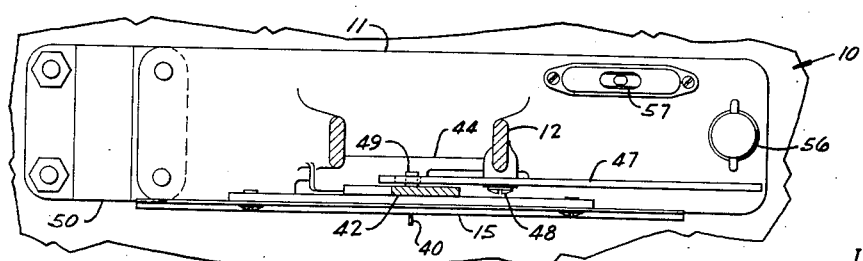
Fig. III
INVENTOR.
Norman E. Hart
BY
Marshall & Marshall
ATTORNEYS July 3, 1951    N. E. HART    2,559,566
WEIGHING SCALE
Filed May 2, 1944    3 Sheets-Sheet 3
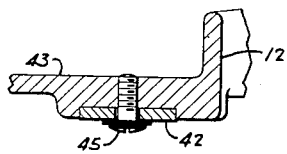
Fig. VII
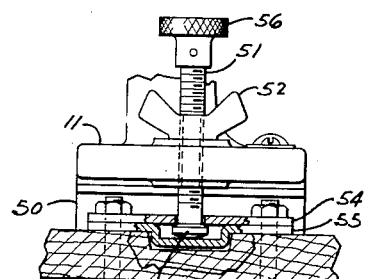
Fig. VIII
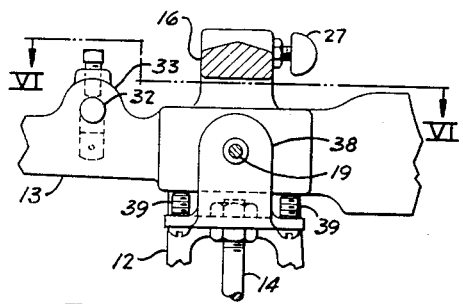
Fig. V
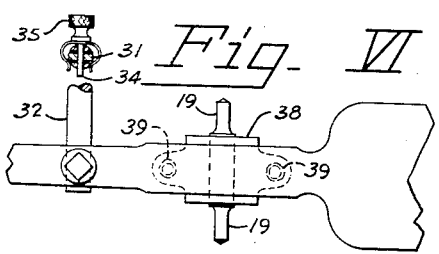
Fig. VI
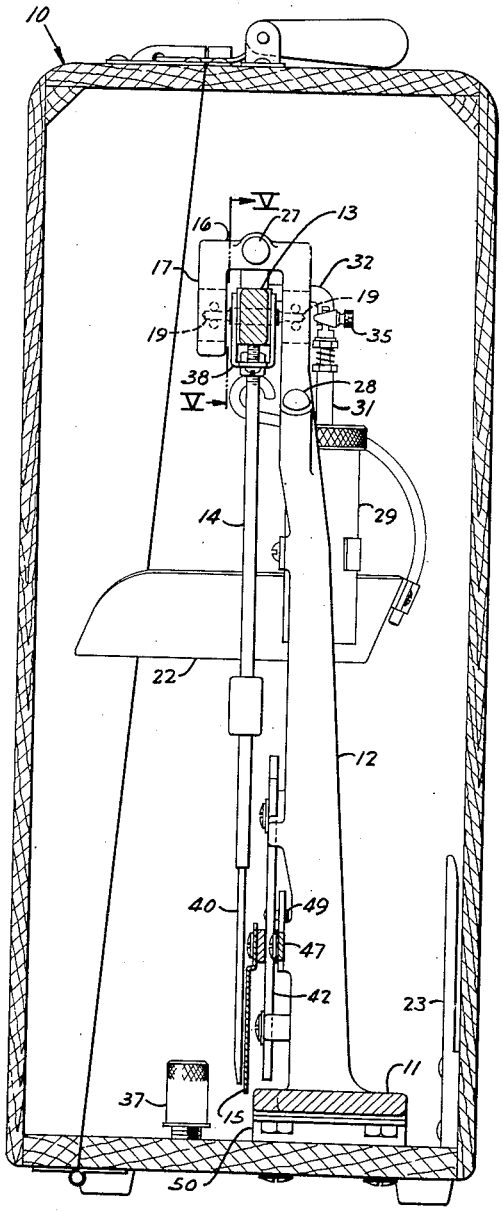
Fig. IV
INVENTOR.
Norman E. Hart
BY
Marshall & Marshall
ATTORNEYS Patented July 3, 1951

2,559,566

UNITED STATES PATENT OFFICE 2,559,566

WEIGHING SCALE

Norman E. Hart, Toledo, Ohio, assignor to Toledo Scale Company, Toledo, Ohio, a corporation of New Jersey Application May 2, 1944, Serial No. 533,756

2 Claims. (Cl. 116—129)

This invention relates to weighing scales and in particular to weighing scales, known as counting scales, which are calibrated to indicate the number of pieces in the load rather than the weight of the load.

The principle of counting by weight is not new. Scales have been designed for this purpose and these scales may be divided into two classes.

Scales of the first of these classes, known as "ratio" counting scales, employ a small number of parts in a sample load receiver to counterbalance a relatively large group of parts in a main load receiver. The number of pieces or count is obtained from the known ratio of the scale and the number of parts in the sample load receiver. Scales of the second class, known as "direct reading" counting scales, employ means to change the calibration of the scale according to the weight of the parts being counted.

The present invention relates to improvements in a counting scale of the second class which materially simplify the scale and increase its field of usefulness.

The object of this invention is to provide a counting scale which is readily portable and is easily adjusted for use.

Another object is to provide a novel chart mounting which allows the calibration of the scale to be readily adjusted for changes in the weight of the parts being counted without disturbing the zero adjustment.

A further object is to provide, in a weighing scale whose calibration is adjusted by moving its chart, a second chart adapted to indicate the change in calibration of the weighing chart with movement thereof.

A still further object is to provide means to firmly mount the base of a weighing scale in a carrying case while still allowing the base to be readily leveled.

These and more specific objects and advantages are apparent from the following description in which reference is made to the accompanying drawings.

In the drawings:

Figure I is a front elevation of a portable counting scale as mounted in a carrying case. A portion of the case is cut away to reveal the scale.

Figure II is a fragmentary front elevation of the scale shown in Figure I at an enlarged scale and with some of the parts broken away to reveal the construction of the chart moving mechanism.

Figure III is a horizontal section taken along the line III—III of Figure II.

Figure IV is a vertical section taken substantially along the line IV—IV of Figure II.

Figure V is an enlarged section taken substantially along the line V—V of Figure IV.

Figure VI is a fragmentary plan of the fulcrum portion of the lever.

Figure VII is an enlarged fragmentary plan of the chart mounting slide taken along the line VII—VII of Figure II.

Figure VIII is an enlarged end elevation of the leveling screw, parts being shown in section.

Figure IX is a fragmentary front elevation showing a counting scale equipped with a straight line chart and a secondary chart for indicating the position of the first chart.

In a counting scale designed to count parts of uniform weight and having a chart graduated according to the weight of the parts, any change in weight of the parts of a particular lot with respect to the standard weight of that part results in an error which must be allowed for in determining the total count.

This invention provides means for compensating for the variation in weight by changing the calibration of the scale in proportion to the change in weight. This is accomplished by moving the chart either toward or away from the axis about which the indicator is pivoted. Because the indicator assumes definite positions for definite weights, the motion of the chart toward or from the indicator axis changes the effective calibration and thus provides an easy method for compensating for small variations in the weight of the pieces to be counted. Because it is desirable, when such a calibration is made, that the zero of the scale remain unchanged the chart is moved along a line parallel to the index portion of the indicator when the indicator is at the zero position.

The invention, further, provides a flexure plate for mounting one end of the base of the scale from the bottom of the carrying case and an adjusting screw at the other end of the base. This construction has the advantage that the weighing mechanism is always firmly mounted within the case but is yet capable of being adjusted for any out of level condition of the surface on which the case is resting.

These improvements are embodied in a portable scale designed to count, by weight, large numbers of small stamps or other similar items. The nominal weight of the stamps is a fairly constant quantity although material variations occur from lot to lot. One cause of variation is changes in atmospheric humidity. The scale is conditioned for counting these stamps by first leveling the base then placing a quantity of stamps, which were previously hand counted, in the load receiver and adjusting the chart position until the indication agrees with the hand count. This operation, while it takes a few moments, compensates for all of the variables encountered in a particular group of stamps.

These advantages are attained in the specific example illustrated in the drawings. This example is a portable counting scale enclosed in a carrying case 10 and comprises a base 11, an A-shaped stand 12 erected on the base 11, a lever 13 pivotally mounted at the top of the stand 12, an indicator 14 attached to the lever 13 and a chart 15. The top of the stand 12 is provided with a forwardly extending horizontal section 16, and a portion 17 depending from the forward end of the horizontal section 16. The depending portion 17 and the upper part of the stand 12 immediately therebehind are bored to receive a pair of ball bearings 18. The lever 13, provided with trunnions 19, is pivotally supported in the bearings 18.

The lever 13 is provided near one extremity with a load pivot 20. A stirrup 21 depending from the load pivot 20 supports a scoop-shaped load receiving pan 22. When not in use the pan 22 is removed from the stirrup 21 and slipped behind a pair of cleats 23 attached to the rear wall of the case 10.

The end of the lever 13 opposite that containing the load pivot 20 is formed as a hollow shell open at the bottom. In this hollow shell a counterweight 24 is adjustably mounted on a leaf 25 secured to the lever by a screw 26.

A pair of rubber headed screws 27 and 28 are fitted into the stand 12 and act as stops for the lever 13.

A dashpot 29 mounted on a bracket 30 extending from the stand 12 is provided to control the oscillations of the lever resulting from changes of load. A stem 31 connected to the piston of the dashpot 29 has its upper end flattened and transversely drilled. The tongue thus formed fits in the bifurcated end of an L-shaped arm 32 extending outwardly and downwardly from a boss 33 in the lever 13. A pin 34 forming part of a clip 35 is fitted through horizontal holes in the end of the arm 32 and the hole in the dashpot stem 31 thereby pivotally connecting the dashpot and lever. Spring arms forming part of the clip 35 prevent the pin from working loose.

The dashpot 29 is fitted with a cap 36 having an axial hole to accommodate the stem 31. Because the scale is portable an auxiliary cap 37 is provided to seal the dashpot while the scale is being transported. The cap 37 has an axial recess adapted to fit over the stem 31 and is applied by merely unhooking the stem 31 from the arm 32 and screwing the cap 37 into the cap 36.

The indicator 14 at its upper end is secured to a yoke 38 rotatably mounted on the shanks of the trunnions 19. A pair of screws 39 threaded vertically through the bottom of the yoke 38 engages the lever 13 and provides means for adjusting and maintaining the angular position of the indicator 14 with respect to the lever 13.

The lower end of the indicator 14 is provided with a knife blade index 40 to cooperate with a series of indicia 41 carried on the chart 15. The chart 15 is rigidly mounted on a slide 42 which in turn is slidably mounted in cross members 43 and 44 of the stand 12. A pair of screws 45 passing through slots 46 in the slide 42 holds the slide in notches in the cross members. The notches in the cross members 43 and 44 are so located that the motion of the chart 15 is along a line parallel to the line joining the center of the bearings 18 and the zero indicium of the series of indicia 41 on the chart 15. Thus, regardless of the position of the chart, the zero reading of the chart is not changed.

The chart 15 is moved into position by an operating lever 47 pivotally mounted on a screw 48 threaded into one of the legs of the stand 12 and engaging a pin 49 extending rearwardly from the slide 42.

A flexible, yet firm, spring hinge 50 is attached to the bottom of the case 10 and to one end of the base 11. The other end of the base 11 is supported by a leveling screw 51. The leveling screw 51 is locked in adjusted position by a wing nut 52. The lower end of the leveling screw 51 is provided with an oval head 53 which is held between plates 54 and 55 secured to the bottom of the case 10. The leveling screw 51 is rotated by turning a knurled knob 56 at its upper end until a spirit level 57 attached to the base 11 indicates that the base is level.

While the spring hinge 50 is shown as being generally horizontal, it may also be formed so that its center section is substantially vertical. In this particular example the weights of the loads being weighed are so insignificant with respect to the weight of the base 11 and the weighing structure that the deflection of the flat spring hinge 50 with changes in load is not appreciable. If the loads being weighed are of the same order of magnitude as the weight of the structure the hinge 50 is formed with its central portion vertical so that it acts as a column rather than a cantilever beam. The only other requirement is that the hinge 50 be capable of accommodating the maximum range of adjustment of the leveling screw 51 without exceeding its elastic limit.

In the operation of this scale, which was specifically designed for counting small paper stamps of generally constant weight, the operator first hand counts a sample approximately equal to the scale capacity, places them on the scale, and by means of the lever 47 adjusts the position of the chart 15 until the indication of the knife blade index 40 on the indicia 41 agrees with the hand count. The scale is thus adjusted for the type and condition of stamps represented by the sample and the operator may then continue to count the remaining stamps by merely placing them in the scoop and reading the count from the indicia 41.

The indicia 41 are arranged along the arcuate path described by the index 40. Because the scale is of the so-called "hook pull" variety the indicia 41 are not equally spaced. Therefore, a slight error in indication is introduced as the chart is moved away from its midposition. This error may be eliminated by arranging the indicia along a straight line as is shown in Figure IX. In this example, in which only the essential parts of the chart and indicator are shown, the scale comprises a base 11a, an A-shaped stand 12a erected on the base 11a, an indicator 14a including a knife blade index 40a depending from a lever, not shown, and a chart 15a. The chart 15a bears indicia 41a disposed along a straight line along the path of the index 40a. A slide 42a, carrying the chart 15a, is slidably mounted on cross members in the stand 12a to allow the chart 15a to move parallel to the line connecting the zero indicium of the series of indicia 41a and the fulcrum axis of the lever. A secondary indicator 58 attached to the slide 42a cooperates with indicia 59 printed on a secondary chart 60 attached to the stand 12a. The indicia 59 are arranged to indicate the percentage of increase or decrease in the value of the indicia 41a produced by the translatory motion of the chart 15a.

The indicia 59 as shown in Figure IX indicate the percentage deviation in the weight of the sample from the standard weight for which the scale is adjusted. Thus if, when a hand count is made and the lot so determined is placed in the scale, the chart 15a must be lowered to secure a corresponding indication the parts being counted are underweight and the indicia 59 indicate the percentage underweight. Likewise, if the chart 15a must be raised to secure corresponding indications the particular sample being weighed is overweight.

The disclosed means for adjusting the scale calibration by indicated amounts is also useful for determining the moisture content of a material, for weighing out quantities of material to a definite final or dry weight when the substance is known to have a certain percentage of moisture, for adding a predetermined amount of material to a load on the scale, and other similar applications.

When the scale is used as a moisture tester, the sample is first weighed with the chart in its zero position; i. e. its normal, or 100% reading point; and its weight noted. The sample is then dried in an oven or by some other means and then reweighed. This time the chart is moved down to get the same weight reading as before. The distance the chart must be moved is proportional to the percentage of moisture in the original sample. The secondary chart can be calibrated directly in terms of moisture content.

If it is desired to weigh out to meet a predetermined processed weight definite quantities of a material which is known to experience a certain percentage shrink in weight during processing, such as bread before baking, the chart is set for the percentage change and the scale will then indicate the final weight when the raw material is placed on the load receiver. It thus becomes a simple matter to weigh out the required quantity.

Another application is in the meat packing industry where hams are pickled by pumping brine into the arteries. It is desirable to add an amount of brine equal to a definite proportion of the weight of the ham. This is accomplished by weighing the ham with the chart in its normal position, then shifting the chart to the desired percentage and adding brine until the original weight indication is again reached. If desired, two charts can be used to avoid changing the chart position for each ham.

This scale is also well adapted for compounding materials. For example, suppose the formula calls for ninety percent of ingredient A, six percent of ingredient B, four percent of ingredient C, and the total is to be D units of weight. This is easily compounded on this scale by first setting the chart for ten percent under (ninety percent of weight) and weighing in D units of ingredient A, then setting the chart for four percent under (ninety plus six percent of weight) and adding ingredient B until the indicator again indicates D units, and finally setting the chart at zero and adding ingredient C until the indicator again indicates D units. Because the scale reads directly in units of weight when set at zero percent the total of ingredients A, B and C so obtained is D units of weight. Alternatively, the formula may give the amounts of some ingredients as percentages of the basic ingredient. In this case E units of the basic ingredient are first weighed with the chart set at zero percent. Then the chart is raised to the percentage of the next ingredient and that ingredient added until the indicator indicates E units. The chart is then raised an additional amount corresponding to the percentage of the next material and that material is added. Thus a formula given in percentages may be compounded without calculation.

These illustrative examples are intended merely as a guide in using the invention and not its limits of usefulness.

Having described my invention, I claim:

1. In a device of the class described in combination, a weighing lever having a fulcrum pivot and a load pivot defining a pivot line that is generally horizontal at the midposition of the lever travel, an indicator attached to the lever, the indicator having a straight index portion of substantial length extending radially from the fulcrum of the lever, a chart mounted parallelly adjacent the path of the index portion of the indicator and having indicia equally spaced along a straight line that is perpendicular to the index portion when said pivot line is horizontal, guide means extending parallel to a line through the zero indicium of the chart and the fulcrum pivot for supporting the chart and mechanism for moving the chart along the guide means.

2. In a device of the class described, in combination, a weighing lever having a fulcrum pivot and a load pivot defining a pivot line that is horizontal near the midposition of the lever travel, an indicator attached to the lever and having a straight index portion of substantial length extending radially from the fulcrum of the lever, a chart positioned along the path of the index portion and having indicia equally spaced along a straight line that is perpendicular to the index portion when the pivot line is horizontal, guide means that support the chart for translation along an inclined line passing through the fulcrum of the lever and the zero load indicium of the chart, a chart index mounted on the chart and a second chart extending along the path of the chart index to cooperate with the chart index to indicate the displacement of the first mentioned chart.

NORMAN E. HART.

REFERENCES CITED

The following references are of record in the file of this patent:

UNITED STATES PATENTS

| Number | Name | Date |
|---|---|---|
| 1,258,009 | Jacobs | Mar. 5, 1918 |
| 1,551,726 | Birk | Sept. 1, 1925 |
| 1,743,354 | Johnson | Jan. 14, 1930 |
| 1,757,766 | Ferguson et al. | May 6, 1930 |
| 1,825,848 | Benjamin | Oct. 6, 1931 |
| 1,941,981 | Fontaine | Jan. 2, 1934 |
| 2,074,384 | Gattoni | Mar. 23, 1937 |
| 2,177,669 | Martin | Oct. 31, 1939 |
| 2,277,700 | Guibert et al. | Mar. 31, 1942 |
| 2,308,044 | Brown et al. | Jan. 12, 1943 |
| 2,316,230 | Enders | Apr. 13, 1943 |

OTHER REFERENCES

"A Treatice on Weighing Machines" by George A. Owen. Pub. 1922 by Charles Griffin & Co., Ltd.